United States Patent
Nomaru

(10) Patent No.: US 7,402,773 B2
(45) Date of Patent: Jul. 22, 2008

(54) LASER BEAM PROCESSING MACHINE

(75) Inventor: Keiji Nomaru, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/437,675

(22) Filed: May 22, 2006

(65) Prior Publication Data

US 2006/0266744 A1 Nov. 30, 2006

(30) Foreign Application Priority Data

May 24, 2005 (JP) .............................. 2005-151001

(51) Int. Cl.
*B23K 26/06* (2006.01)

(52) U.S. Cl. .......................... 219/121.73; 219/121.67; 219/121.75

(58) Field of Classification Search ............ 219/121.67, 219/121.73, 121.75, 121.76, 121.72, 121.77; 359/495
See application file for complete search history.

(56) References Cited

U.S. PATENT DOCUMENTS

| | | | | |
|---|---|---|---|---|
| 4,758,070 A | * | 7/1988 | Nishimoto | 359/319 |
| 4,908,493 A | * | 3/1990 | Susemihl | 219/121.67 |
| 4,981,342 A | * | 1/1991 | Fiala | 359/494 |
| 5,051,575 A | * | 9/1991 | Hino | 250/225 |
| 5,142,411 A | * | 8/1992 | Fiala | 359/494 |
| 5,410,375 A | * | 4/1995 | Fiala | 351/168 |
| 5,867,315 A | * | 2/1999 | Koike et al. | 359/495 |
| 2005/0006361 A1 | * | 1/2005 | Kobayashi et al. | 219/121.73 |
| 2005/0109742 A1 | * | 5/2005 | Nagai et al. | 219/121.73 |

FOREIGN PATENT DOCUMENTS

| | | | |
|---|---|---|---|
| EP | 837455 A2 | * | 4/1998 |
| JP | 61-277919 A | * | 12/1986 |
| JP | 8-122272 A | * | 5/1996 |
| JP | 2000-190087 A | * | 7/2000 |
| JP | 3408805 | | 3/2003 |
| JP | 2005-28438 | | 2/2005 |

* cited by examiner

*Primary Examiner*—Geoffrey S Evans
(74) *Attorney, Agent, or Firm*—Smith, Gambrell & Russell, LLP

(57) ABSTRACT

Disclosed herein is a laser beam processing machine having a chuck table for holding a workpiece, a laser beam applicator for applying a laser beam capable of passing through the workpiece to the workpiece held on the chuck table, and a processing-feeder for moving the chuck table and the laser beam applicator relative to each other, the laser beam applicator having a laser beam oscillator, an optical transmitter for transmitting a laser beam oscillated from the laser beam oscillator and a condenser lens for converging a laser beam transmitted by the optical, transmitter. The optical transmitter includes a birefringence lens for separating the laser beam oscillated from the laser beam oscillator into normal light and abnormal light; and the condenser lens converges respectively the normal light and the abnormal light separated by the birefringence lens to form the focal point of the normal light and the focal point of the abnormal light.

5 Claims, 4 Drawing Sheets

LASER BEAM PROCESSING MACHINE

FIELD OF THE INVENTION

The present invention relates to a laser beam processing machine for applying a laser beam such as a pulse laser beam capable of passing through a workpiece such as a semiconductor wafer to form deteriorated layers in the inside of the workpiece.

DESCRIPTION OF THE PRIOR ART

In the production process of a semiconductor device, a plurality of areas are sectioned by dividing lines called "streets" formed in a lattice pattern on the front surface of a wafer comprising a suitable substrate such as a silicon substrate, sapphire substrate, silicon carbide substrate, lithium tantalate substrate, glass substrate or quartz substrate, and a device (functional device) such as IC or LSI is formed in each of the sectioned areas. Individual semiconductor devices are manufactured by cutting this wafer along the dividing lines to divide it into the areas on which a functional device has been formed. As a means of dividing the wafer, various methods making use of a laser beam are proposed.

As a means of dividing a plate-like workpiece such as a semiconductor wafer, a laser processing method for applying a pulse laser beam capable of passing through the workpiece with its focal point set to the inside of the area to be divided is also attempted, and disclosed by Japanese Patent No. 3408805, for example. In the dividing method making use of this laser processing technique, the workpiece is divided by applying a pulse laser beam capable of passing through the workpiece, for example, a wavelength of 1,064 nm from one side of the workpiece with its focal point set to the inside to continuously form a deteriorated layer in the inside of the workpiece along the dividing lines and exerting external force along the dividing lines whose strength has been reduced by the formation of the deteriorated layers.

To divide the wafer along the dividing lines accurately by applying external force to the wafer, the thickness of the deteriorated layer, that is, the size of the deteriorated layer in the thickness direction of the wafer must be made relatively large. Since the thickness of the deteriorated layer formed by the above laser processing method is 10 to 50 μm in the vicinity of the focal point of the pulse laser beam, the position of the focal point of the pulse laser beam must be displaced in the thickness direction of the wafer, and the pulse laser beam and the wafer must be moved relative to each other along the dividing line repeatedly in order to increase the thickness of the deteriorated layer. Therefore, when the thickness of the wafer is relatively large, it takes long time to form a deteriorated layer thick enough to divide the wafer accurately.

To solve the above problem, JP-A 2005-28438 discloses a laser beam processing machine for forming a plurality of deteriorated layers at the same time by forming a plurality of focal points of a pulse laser beam in the thickness direction of a workpiece.

With the laser beam processing machine disclosed by the above publication, deteriorated layers can be formed at a plurality of focal points formed in the thickness direction of the workpiece at the same time. However, this laser beam processing machine comprises a relatively complicated mechanism for forming a plurality of focal points and therefore, is not always satisfactory for practical use.

SUMMARY OF THE INVENTION

It is an object of the present invention to provide a laser beam processing machine capable of forming two deteriorated layers at the same time in the thickness direction of a workpiece with a simple structure.

To attain the above object, according to the present invention, there is provided a laser beam processing machine comprising a chuck table for holding a workpiece, a laser beam application means for applying a laser beam capable of passing through the workpiece to the workpiece held on the chuck table, and a processing-feed means for moving the chuck table and the laser beam application means relative to each other, the laser beam application means comprising a laser beam oscillation means, an optical transmission means for transmitting a laser beam oscillated from the laser beam oscillation means and a condenser lens for converging a laser beam transmitted by the optical transmission means, wherein the optical transmission means comprises a birefringence lens for dividing the laser beam oscillated from the laser beam oscillation means into normal light and abnormal light; and the condenser lens converges respectively the normal light and the abnormal light separated by the birefringence lens to form the focal point of the normal light and the focal point of the abnormal light.

The above optical transmission means comprises a wave plate which is interposed between the laser beam oscillation means and the birefringence lens.

The above birefringence lens is composed of a glass body having a convex surface with a predetermined curvature and a crystal body having a concave surface with a curvature corresponding to the convex surface of the glass body, and the convex surface of the glass body and the concave surface of the crystal body are united.

Preferably, a birefringence deflection plate for displacing the optical axis of the laser beam applied to the condenser lens in a feed direction is interposed between the birefringence lens and the condenser lens. The birefringence deflection plate is composed of a crystal body having an inclined surface with a predetermined inclination angle and a glass body having an inclined surface corresponding to the inclined surface of the crystal body, and the inclined surface of the crystal body and the inclined surface of the glass body are united.

Preferably, a focal point depth displacing means for displacing the depth position of the focal point of the laser beam formed by means of the condenser lens is interposed between the laser beam oscillation means and the birefringence lens.

In the laser beam processing machine of the present invention, a laser beam oscillated from the laser beam oscillation means is separated into normal light and abnormal light by the birefringence lens, and the normal light and the abnormal light are respectively converged by the condenser lens to form the focal point of the normal light and the focal point of the abnormal light. Therefore, two deteriorated layers can be formed at the same time. With the laser beam processing machine of the present invention, which has a simple structure and comprises the birefringence lens, two deteriorated layers can be thus formed in the thickness direction of the workpiece at the same time.

DETAILED DESCRIPTION OF THE PREFERRED EMBODIMENTS

Preferred embodiments of a laser beam processing machine constituted according to the present invention will be described in detail hereinunder with reference to the accompanying drawings.

Figure 1:
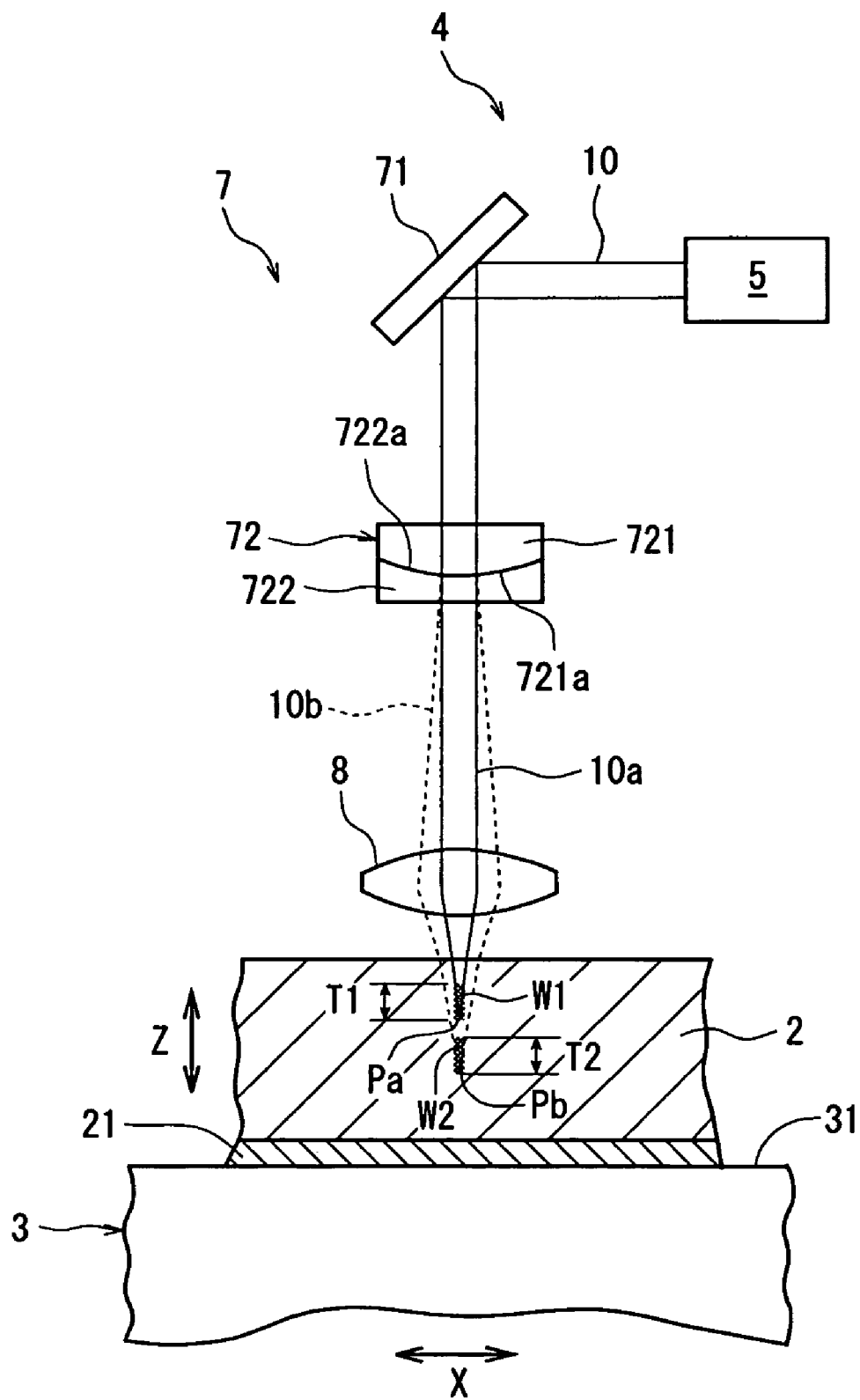
FIG. 1 is a schematic constituent diagram of a laser beam processing machine constituted according to the present invention.

FIG. 1 is a schematic diagram of an embodiment of a laser beam processing machine constituted according to the present invention. The laser beam processing machine shown in FIG. 1 comprises a chuck table 3 for holding a wafer 2 as a workpiece and a laser beam application means denoted by 4 as a whole.

The chuck table 3 comprises an adsorption chuck 31 made of a porous member or having a plurality of suction holes or grooves, and the adsorption chuck 31 is communicated with a suction means that is not shown. Therefore, when the circuit side, onto which a protective tape 21 is affixed, of the wafer 2 as a workpiece is placed on the adsorption chuck 31 and the suction means (not shown) is activated, the wafer 2 is suction-held on the chuck table 3. The chuck table 3 constituted as described above is designed to move in a processing-feed direction indicated by an arrow X in FIG. 1 by a processing-feed means that is not shown. Therefore, the chuck table 3 and the laser beam application means 4 can move relative to each other in the processing-feed direction indicated by the arrow X.

The laser beam application means 4 comprises a pulse laser beam oscillation means 5, an optical transmission means 7 for transmitting a pulse laser beam oscillated by this pulse laser beam oscillation means 5, and a condenser lens 8 for converging the laser beam transmitted by the optical transmission means 7. The pulse laser beam oscillation means 5 oscillates a linearly polarized pulse laser beam 10 capable of passing through the wafer 2 as a workpiece. This pulse laser beam oscillation means 5 may be a YVO4 pulse laser oscillator or YAG pulse laser oscillator for oscillating a pulse laser beam 10 having a wavelength of 1,064 nm when the wafer 2 is a wafer comprising a silicon substrate, silicon carbide substrate, lithium tantalate substrate, glass substrate or quartz substrate.

The optical transmission means 7 comprises a direction changing mirror 71 for changing the direction of the pulse laser beam 10 oscillated from the pulse laser beam oscillation means 5 at 90° downward in FIG. 1 and a birefringence lens 72 for separating the pulse laser beam 10 whose direction has been changed by the direction changing mirror 71, into normal light and abnormal light. The birefringence lens 72 is composed of a LASF35 glass body 721 and a YVO4 crystal body 722 in the illustrated embodiment. The LASF35 glass body 721 has a convex surface 721a with a predetermined curvature (for example, curvature radius of 58 mm) and the YVO4 crystal body 722 has a concave surface 722a with a curvature corresponding to the convex surface 721a of the glass body 721, and the convex surface 721a of the glass body 721 and the concave surface 722a of the crystal body 722 are united to constitute the birefringence lens 72. The birefringence lens 72 constituted as described above separates the pulse laser beam 10 into normal light 10a indicated by a solid line and abnormal light 10b indicated by a broken line in FIG. 1 when the pulse laser beam 10 whose direction has been changed by the direction changing mirror 71 is caused to enter at a predetermined angle to the optical axis of the YVO4 crystal body 722. That is, the birefringence lens 72 allows the normal light 10a to pass through without refracting it and refracts the abnormal light 10b outward by means of the crystal body 722 having the concave surface 722a. To cause the pulse laser beam 10 to be entered at a predetermined angle from the optical axis of the YVO4 crystal body 722, the birefringence lens 72 may be turned around the optical axis of the incident pulse laser beam 10 as the center to make adjustment, or the pulse laser beam oscillation means 5 may be turned around the optical axis of the pulse laser beam as the center to make adjustment.

A description will be subsequently given of another embodiment in which the pulse laser beam 10 is caused to enter at a predetermined angle with respect to the optical axis of the YVO4 crystal body 722 with reference to FIG. 2.

Figure 2:
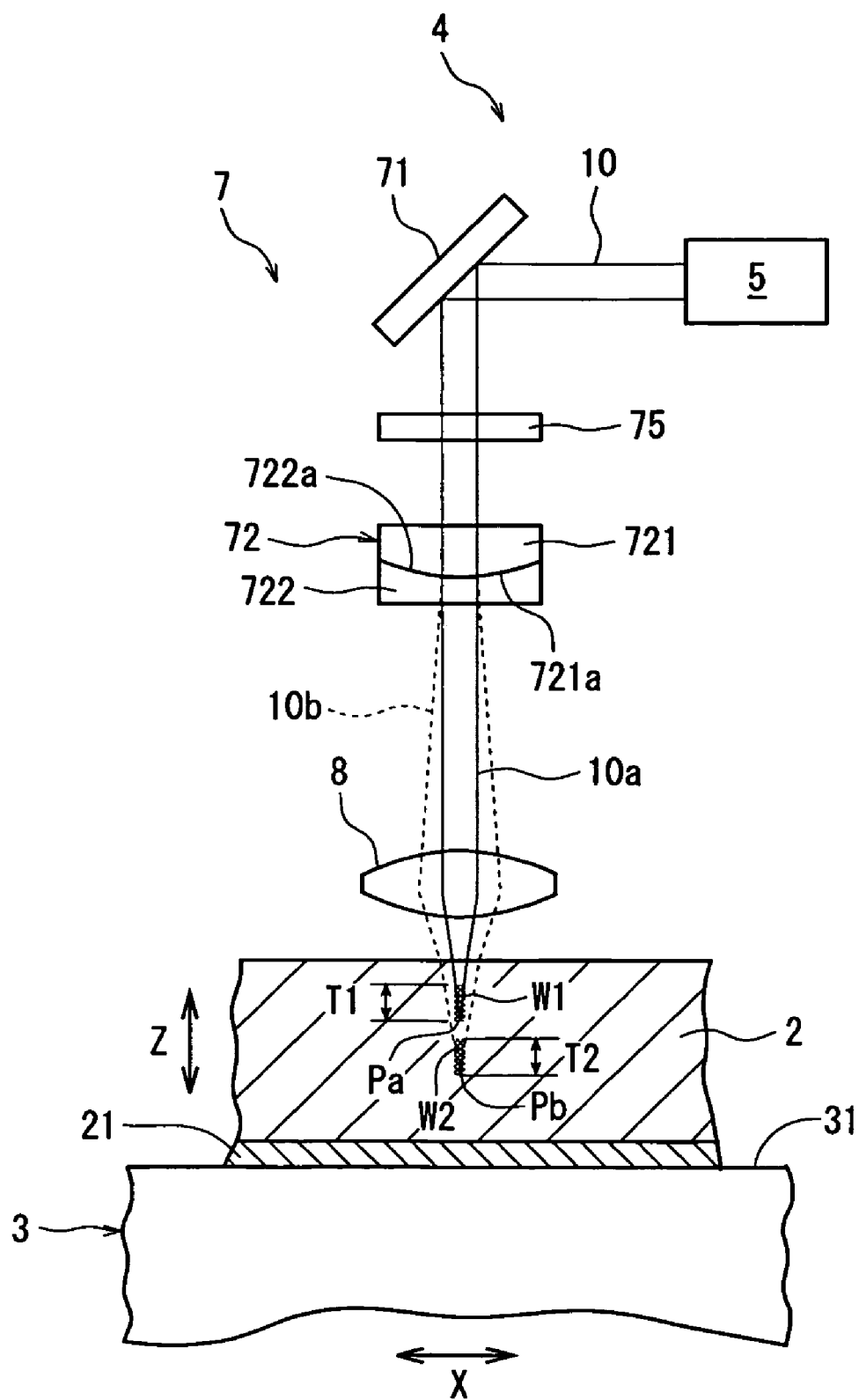
FIG. 2 is a schematic diagram of another embodiment of laser beam application means provided in the laser beam processing machine shown in FIG. 1.

In the embodiment shown in FIG. 2, a half-wave plate 75 is interposed between the direction changing mirror 71 and the birefringence lens 72 in the embodiment shown in FIG. 1. This half-wave plate 75 moves in the polarization plane to change the incidence angle of the pulse laser beam 10 with respect to the optical axis of the YVO4 crystal body 722. By setting the incidence angle of the pulse laser beam 10 with respect to the optical axis of the YVO4 crystal body 722 to 45°, the ratio of the normal light 10a to the abnormal light 10b separated by the birefringence lens 72 can be set to 50:50.

The above condenser lens 8 converges the normal light 10a and the abnormal light 10b separated by the birefringence lens 72. That is, the condenser lens 8 converges the normal light 10a at the focal point Pa in the inside of the wafer 2 as the workpiece and the abnormal light 10b at the focal point Pb in the inside of the wafer 2 as the workpiece. Since the abnormal light 10b is refracted outward by the birefringence lens 72 as described above, this focal point Pb is at a position deeper than the focal point Pa of the normal light 10a (lower position in FIG. 1 and FIG. 2), that is, at a position away from the condenser lens 8 in the optical axis direction.

In the embodiment shown in FIG. 1 and FIG. 2, the birefringence lens 72 is composed of the glass body 721 having a convex surface 721a and the crystal body 722 having a concave surface 722a. The glass body may have a concave surface and the crystal body may have a convex surface. In this case, the focal point of the abnormal light is at a position shallower than the focal point of the normal light (an upper position in FIG. 1 and FIG. 2), that is, a position close to the condenser lens 8 in the optical axis direction.

When the normal light 10a of the pulse laser beam 10 is converged at the focal point Pa as described above, a deteriorated layer W1 is formed in the wafer 2 as the workpiece in the vicinity of the focal point Pa, generally in an area having a thickness T1 in an upward direction from the focal point Pa. Meanwhile, when the abnormal light 10b of the pulse laser beam 10 is converged at the focal point Pb, a deteriorated layer W2 is formed in the wafer 2 as the workpiece in the vicinity of the focal point Pb, generally in an area having a thickness T2 in an upward direction from the focal point Pb.

The deteriorated layers formed in the wafer 2 as the workpiece are generally molten and re-solidified voids or cracks (that is, voids or cracks which are formed by being molten when the normal light 10a and the abnormal light 10b of the pulse laser beam 10 are converged and then solidified after the convergence of the pulse laser beam 10 ends) though this depends on the material of the wafer 2 or the intensities of the converged normal light 10a and abnormal light 10b of the pulse laser beam 10.

Figure 3:
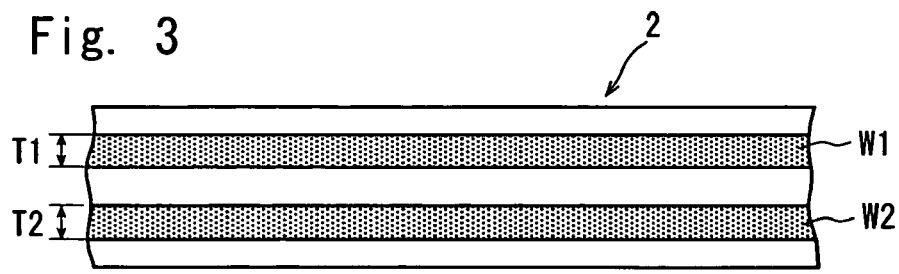
FIG. 3 is a schematic diagram showing a state where two deteriorated layers are formed at the same time in the inside of the workpiece by the laser beam processing machine shown in FIG. 1.

The laser beam processing machine in the illustrated embodiment moves the chuck table 3 (therefore, the wafer 2 as the workpiece held on the chuck table 3), for example, in a left direction in FIG. 1 and FIG. 2 while applying the pulse laser beam as described above. As a result, two deteriorated layers W1 and W2 having thicknesses T1 and T2 are formed at the same time along a predetermined dividing line in the inside of the wafer 2 as shown in FIG. 3, respectively. Thus, according to the laser beam processing machine in the illustrated embodiment, with a simple structure having the birefringence lens 72, two deteriorated layers W1 and W2 having thicknesses T1 and T2 can be formed at the same time in two areas displaced in the thickness direction of the wafer 2 as the workpiece, respectively.

The processing conditions in the above laser processing are set as follows, for example.

Light source: LD excited Q switch Nd:YAG pulse laser
Wavelength: 1,064 nm
Pulse output: 2.5 µJ
Focal spot diameter: 1 µm
Pulse width: 40 ns
Repetition frequency: 100 kHz
Processing-feed rate: 100 mm/sec When the wafer 2 as the workpiece is thick and the deteriorated layers W1 and W2 having thicknesses T1 and T2 are not satisfactory for dividing the wafer 2 along the dividing lines accurately, the laser beam application means 4 and the chuck table 3 are moved relative to each other by a predetermined distance in the optical axis direction, that is, in the vertical direction indicated by an arrow Z in FIG. 1 and FIG. 2 to displace the focal point Pa and the focal point Pb in the optical axis direction, that is, in the thickness direction of the wafer 2 as the workpiece. Then, the chuck table 3 is moved in the processing-feed direction indicated by the arrow X in FIG. 1 and FIG. 2 while the pulse laser beam is applied from the laser beam application means 4. As a result, the deteriorated layers W1 and W2 having thicknesses T1 and T2 can be formed in areas displaced in the thickness direction in the wafer 2 as the workpiece, respectively, in addition to the above deteriorated layers W1 and W2.

A description is subsequently given of another embodiment of the optical transmission means 7 constituting the laser beam application means 4 with reference to FIG. 4.

Figure 4:
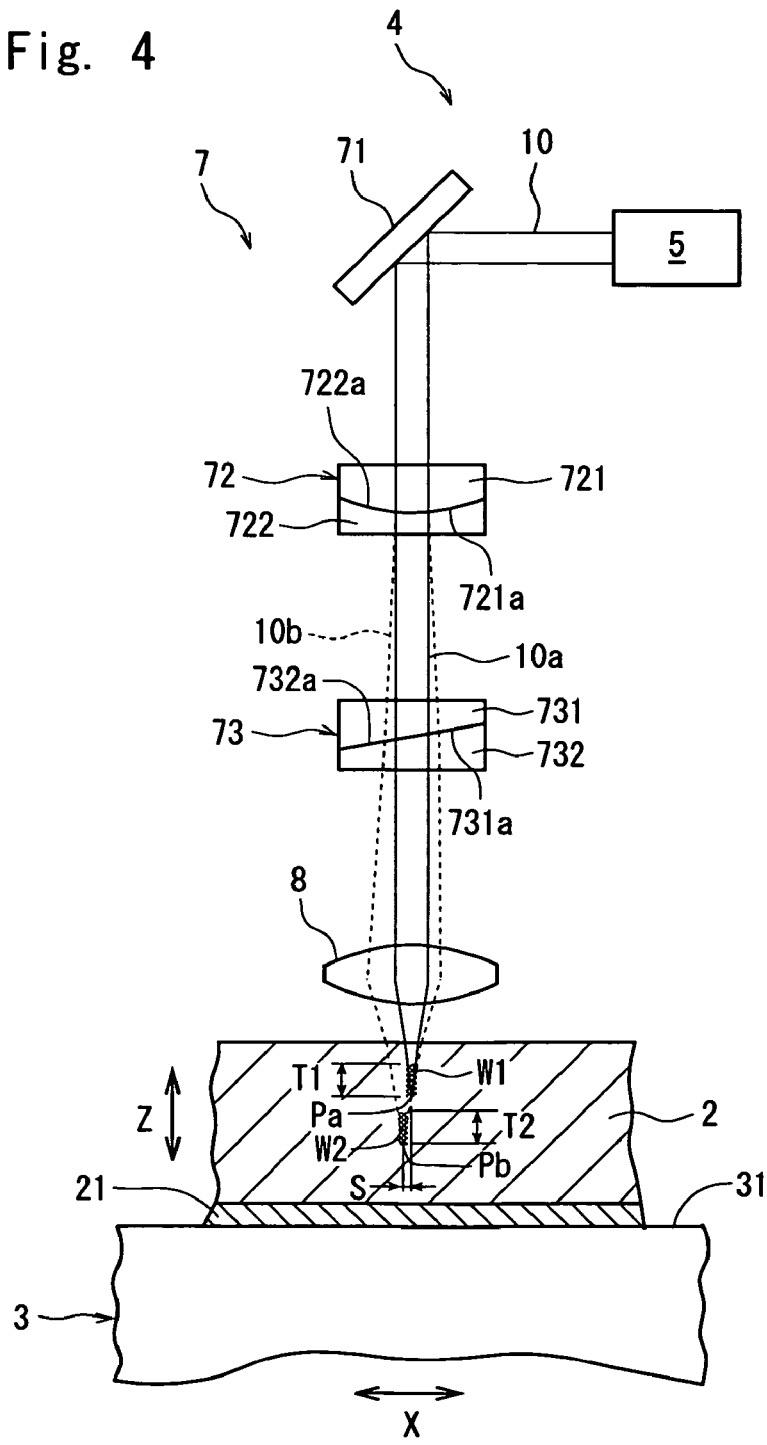
FIG. 4 is a schematic diagram showing another embodiment of optical transmission means constituting the laser beam application means provided in the laser beam processing machine shown in FIG. 1.

The optical transmission means 7 shown in FIG. 4 comprises a birefringence deflection plate 73 for displacing the optical axes of the normal light 10a and the abnormal light 10b of the laser beam 10 applied to the condenser lens 8 in the processing-feed direction X, the birefringence deflection plate 73 being interposed between the birefringence lens 72 and the condenser lens 8 in the embodiment shown in FIG. 1. Since the constituent elements of the laser beam application means 4 in the embodiment shown in FIG. 4 are identical to those of the laser beam application means 4 shown in FIG. 1 except for the birefringence deflection plate 73, the same members are given the same reference symbols, and their descriptions are omitted.

The birefringence deflection plate 73 is composed of a YVO4 crystal body 731 and a LASF35 glass body 732 in the illustrated embodiment. The YVO4 crystal body has a surface with a predetermined inclination angle (for example, 3.5°) and the LASF35 glass body 732 has an inclined surface 732a corresponding to the inclined surface 731a of the YVO4 crystal body 731, and the inclined surface 731a of the YVO4 crystal body 731 and the inclined surface 732a of the LASF35 glass body 732 are united to constitute the birefringence deflection plate 73. The birefringence deflection plate 73 constituted as described above allows the normal light 10a of the pulse laser beam 10 separated by the birefringence lens 72 to pass through without refracting it and refracts the abnormal light 10b in a left direction in FIG. 4. As a result, the condenser lens 8 converges the normal light 10a at the focal point Pa in the inside of the wafer 2 as the workpiece and the abnormal light 10b at the focal point Pb displaced in the left direction from the focal point Pa of the normal light 10a in the inside of the wafer 2 as the workpiece by a distance S in the processing-feed direction indicated by the arrow X in FIG. 4. Since the abnormal light 10b is refracted outward by the birefringence lens 72 as described above, the focal point Pb is at a position deeper than the focal point Pa of the normal light 10a (lower position in FIG. 4), that is, a position away from the condenser lens 8 in the optical axis direction.

When the normal light 10a of the pulse laser beam 10 is converged at the focal point Pa as described above, the deteriorated layer W1 is formed in the wafer 2 as the workpiece in the vicinity of the focal point Pa, generally in the area having a thickness T1 in an upward direction from the focal point Pa. Meanwhile, when the abnormal light 10b of the pulse laser beam 10 is converged at the focal point Pb, the deteriorated layer W2 is formed in the wafer 2 as the workpiece 2 in the vicinity of the focal point Pb, generally in the area having a thickness T2 in an upward direction from the focal point Pb. Since the focal point Pb of the abnormal light 10b is displaced from the focal point Pa of the normal light 10a by the distance S in the processing-feed direction indicated by the arrow X in FIG. 4, the focal point Pa of the normal light 10a and the focal point Pb of the abnormal light 10b do not interfere with each other, and the abnormal light 10b having a deep focal point is not blocked by the normal light 10a having a shallow focal point. Therefore, the deteriorated layers W1 and W2 having desired depths can be formed in the vicinity of the focal point Pa of the normal light 10a and in the vicinity of the focal point Pb of the abnormal light 10b, respectively.

A description will be subsequently given of still another embodiment of the optical transmission means 7 in the laser beam application means 4 with reference to FIG. 5.

Figure 5:
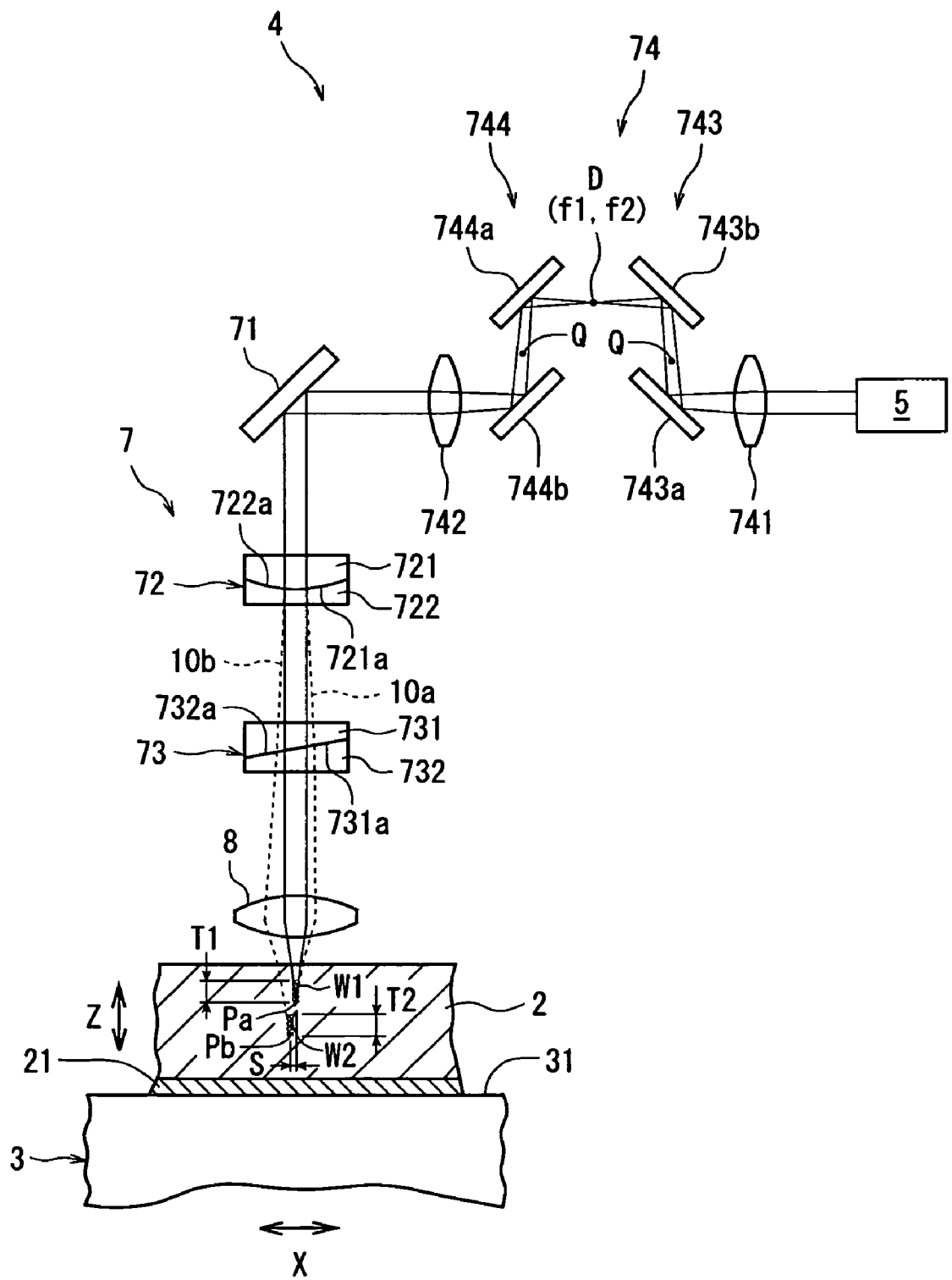
FIG. 5 is a schematic diagram showing still another embodiment of optical transmission means constituting the laser beam application means provided in the laser beam processing machine shown in FIG. 1.

The optical transmission means 7 shown in FIG. 5 comprises a focal point depth displacing means 74 which is interposed between the above pulse laser beam oscillation means 5 and the direction changing mirror 71. Since the constituent elements of the laser beam application means 4 in the embodiment shown in FIG. 5 are identical to those of the embodiment shown in FIG. 4 except for the focal point depth displacing means 74, the same members are given the same reference symbols, and their descriptions are omitted.

The focal point depth displacing means 74 shown in FIG. 5 comprises a first convex lens 741 and a second convex lens 742 which are spaced apart from each other, a first pair of mirrors 743 and a second pair of mirrors 744 which are interposed between the first convex lens 741 and the second convex lens 742. The first pair of mirrors 743 consist of a first mirror 743a and a second mirror 743b which are parallel to each other and fixed to a mirror holding member (not shown) while the spacing between them is kept. The second pair of mirrors 744 consist of a first mirror 744a and a second mirror 744b which are parallel to each other and fixed to a mirror holding member (not shown) while the spacing between them is kept. In the state shown in FIG. 5, the focal point (f1) of the first convex lens 741 and the focal point (f2) of the second convex lens 742 are constituted to meet at a convergence point D between the second mirror 743b of the first pair of mirrors 743 and the first mirror 744a of the second pair of mirrors 744. In this state, the pulse laser beam 10 applied toward the direction changing mirror 71 from the second convex lens 742 becomes parallel.

In the thus constituted focal point depth displacing means 74 shown in FIG. 5, the pulse laser beam 10 oscillated from the pulse laser beam oscillation means 5 is introduced into the direction changing mirror 71 through the first convex lens 741, the first mirror 743a and the second mirror 743b of the first pair of mirrors 743, the first mirror 744a and the second mirror 744b of the second pair of mirrors 744, and the second convex lens 742. The focal point depth displacing means 74 shown in FIG. 5 turns the mirror holding members (not shown) respectively holding the first pair of mirrors 743 and the second pair of mirrors 744 around points Q and Q, as the centers, where the first mirror 743a and the first mirror 744a are each point-symmetrical to the second mirror 743b and the second mirror 744b to change the installation angles of the mirrors, thereby making it possible to respectively displace the focal point (f1) of the first convex lens 741 and the focal point (f2) of the second convex lens 742 in the right-and-left direction in FIG. 5. In the focal point depth displacing means 74 constituted as described above, in the state shown in FIG. 5, the focal point (f1) of the first convex lens 741 and the focal point (f2) of the second convex lens 742 meet at the convergence point D as described above to make the pulse laser beam 10 applied toward the direction changing mirror 71 from the second convex lens 742 parallel. Meanwhile, when the first pair of mirrors 743 and the second pair of mirrors 744 are turned around the points Q and Q as the centers in one direction, the focal point (f1) of the first convex lens 741 is displaced from the convergence point D in the left direction in FIG. 5, and the focal point (f2) of the second convex lens 742 is displaced from the above convergence point D in the right direction in FIG. 5, the pulse laser beam 10 applied toward the direction changing mirror 71 from the second convex lens 742 is broaden toward the end. As a result, the pulse laser beam 10 applied to the above birefringence lens 72 through the direction changing mirror 71 is also broaden toward the end, whereby the focal point Pa of the normal light 10a and the focal point Pb of the abnormal light 10b separated by the birefringence lens 72 and converged by the condenser lens 8 are displaced in a downward direction from the illustrated state. On the other hand, when the first pair of mirrors 743 and the second pair of mirror 744 are turned around the points Q and Q as the centers in the other direction, the focal point (f1) of the first convex lens 741 is displaced from the above convergence point D in the right direction in FIG. 5, and the focal point (f2) of the second convex lens 742 is displaced from the convergence point D in the left direction in FIG. 5, the pulse laser beam 10 applied toward the direction changing mirror 71 from the second convex lens 742 becomes narrower toward the end. As a result, the pulse laser beam 10 applied to the above birefringence lens 72 through the direction changing mirror 71 becomes also narrower toward the end, whereby the focal point Pa of the normal light 10a and the focal point Pb of the abnormal light 10b separated by the birefringence lens 72 and converged by the condenser lens 8 are displaced in an upward direction from the illustrated state.

In the optical transmission means 7, the distance between two focal points can be properly changed in the Z direction and the X direction by preparing a plurality of birefringence lenses having different curvature radii or different crystal bodies and a plurality of birefringence deflection plates having different inclination angles or different crystal bodies and exchanging these birefringence lenses and birefringence deflection plates properly.

What is claimed is:

1. A laser beam processing machine comprising a chuck table for holding a workpiece, a laser beam application means for applying a laser beam capable of passing through the workpiece to the workpiece held on the chuck table, and a processing-feed means for moving the chuck table and the laser beam application means relative to each other, the laser beam application means comprising a laser beam oscillation means, an optical transmission means for transmitting a laser beam oscillated from the laser beam oscillation means and a condenser lens for converging a laser beam transmitted by the optical transmission means, wherein the optical transmission means comprises a birefringence lens for separating the laser beam oscillated from the laser beam oscillation means into normal light and abnormal light; and the condenser lens converges respectively the normal light and the abnormal light separated by the birefringence lens to form the focal point of the normal light and the focal point of the abnormal light by the laser beam to simultaneously form deteriorated layers of different depths in the workpiece, wherein a birefringence deflection plate for displacing the optical axis of the laser beam applied to the condenser lens in a processing-feed direction is interposed between the birefringence lens and the condenser lens.

2. The laser beam processing machine according to claim 1, wherein the optical transmission means comprises a wave plate which is interposed between the laser beam oscillation means and the birefringence lens.

3. The laser beam processing machine according to claim 1, wherein the birefringence lens is composed of a glass body having a convex surface with a predetermined curvature and a crystal body having a concave surface with a curvature corresponding to the convex surface of the glass body, and the convex surface of the glass body and the concave surface of the crystal body are united.

4. The laser beam processing machine according to claim 1, wherein the birefringence deflection plate is composed of a crystal body having an inclined surface with a predetermined inclination angle and a glass body having an inclined surface corresponding to the inclined surface of the crystal body, and the inclined surface of the crystal body and the inclined surface of the glass body are united.

5. The laser beam processing machine according to claim 1, wherein a focal point depth displacing means for displacing the depth position of the focal point of the laser beam formed by means of the condenser lens is interposed between the laser beam oscillation means and the birefringence lens.

* * * * *